Feb. 1, 1944.   G. SPENCER   2,340,434
DOUBLE EXTENSION LENS SCALE
Filed Nov. 10, 1941
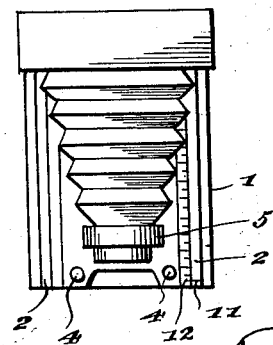
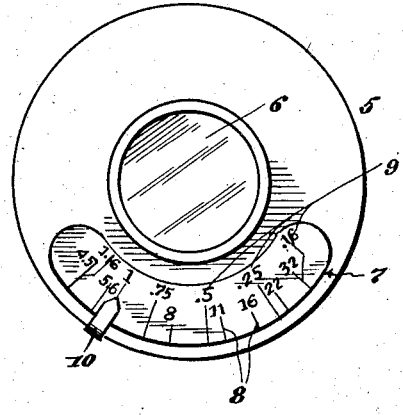
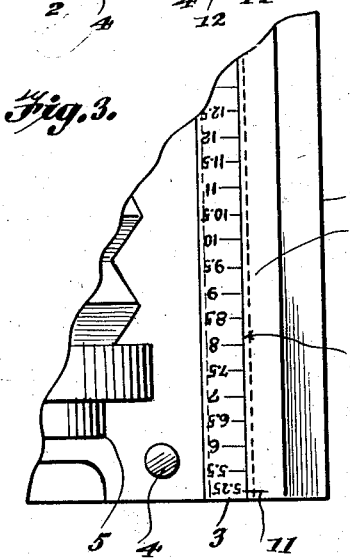
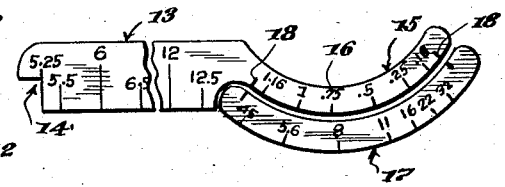
Inventor,
GLENAND SPENCER.

Patented Feb. 1, 1944

2,340,434

UNITED STATES PATENT OFFICE 2,340,434

DOUBLE EXTENSION LENS SCALE

Glenand Spencer, Tampa, Fla.

Application November 10, 1941, Serial No. 418,571

1 Claim. (Cl. 95—44)

This invention relates to cameras in general and to the double-extension type camera in particular. Ordinarily the double-extension camera is equipped with an "f" scale intended to give accurate lens value in terms of lens or iris aperture-focal length ratio when the camera extension bed is locked in infinity focus position. This "f" scale gives the ratio of various apertures to a fixed focal length. Therefore, when this focal length is extended beyond the fixed or infinity focus at which the scale was intended to work, the lens value rendered by this scale becomes increasingly inaccurate with the extension of the focal length.

This invention is a device consisting of two mathematical scales working conjunctively, which will give the photographer an accurate "f" or lens value in terms of lens or iris aperture-focal length ratio regardless of the iris aperture-focal length combination used. Its particular use is determining the "f" value of the lens when lens is extended well beyond the infinity point, as is necessary in the photography of objects at close range.

With the foregoing and other objects in view, my invention comprises certain novel constructions, combinations and arrangements of parts as will be hereinafter fully described, illustrated in the accompanying drawing, and more particularly pointed out in the appended claim.

In the drawing:

Figure 1 is a top plan view of a standard double-extension camera, showing my invention.

Figure 2 is an enlarged view in elevation of a shutter housing, showing my invention applied thereto.

Figure 3 is an enlarged fragmentary plan view of the camera shown in Figure 1.

Figure 4 is a fragmentary perspective view of the outer end of the camera shown in Figures 1 and 3.

Figure 5 is a plan view of another embodiment of this invention.

Referring to the drawing by numerals, I designates the extension bed of the camera on which is secured two slotted guides 2. An extension frame 3 is slidably mounted on said slotted guides 2. Extension frame 3 is provided with operating knobs or grips 4. The camera includes the shutter housing 5 which is provided with the usual lens 6. The standard "f" scale plate 7 is suitably secured on the front of the shutter housing 5 beneath the lens 6. The lower group of calibrations and figures 8 is the standard "f" scale covering lens values at infinity focus. The scale plate 7 is slightly enlarged, and above the "f" ratio scale is a scale 9, indicating iris aperture in terms of a unit of measure and/or fractions thereof only. The scale is calibrated in inches and fractions thereof if the focal length is measured in inches, or in centimeters and/or fractions thereof if the focal length is measured in centimeters, as the case may be. Iris aperture control 10, Fig. 2, is moved along this scale 7 until the desired iris aperture is obtained.

The second scale 12 shown distinctly in Figure 3 is stamped on extension frame 3. On extension frame guide 2 a reference mark 11 is stamped, and opposite it on extension frame 3 is stamped the first calibration of the focal length scale 12, reading the focal length at infinity focus in whatever units of measure (inches or centimeters) the focal length is given. Beginning at the first calibration and extending back on extension frame 3 is stamped the scale in units of measure and/or fractions thereof in which the focal length is given. When extension frame 3 is extended along extension frame guides 2 to bring lens 6 into focus on close objects, the actual focal length, or distance from lens 6 to film can be read at the reference mark 11 on extension frame guide 2 to the nearest fraction in which the scale is calibrated.

For the purpose of presenting example illustrations of use of these scales, focal length and iris aperture is scaled in inches to the half inch in Figures 2 and 3. For example, the photographer extends extension frame 3 to bring subject into focus, and finds that the scale on extension frame 3 reads 8 inches at the reference mark 11 on extension frame guide 2. To determine the "f" value of the lens 6, iris aperture control 10 is moved along aperture scale until the desired working aperture is obtained. Should, for example, this aperture be one inch, the "f" value of the lens is "f8" (iris aperture-focal length ratio—1:8). It is a simple process of dividing the iris aperture—now scaled in inches or centimeters and fractions, into the focal length—likewise scaled, and the "f" value of the lens is the result. To simplify this process a chart or graph may be devised on which iris apertures may be plotted against focal lengths, giving the resultant "f" value of any iris scale-extension frame scale combination.

Referring to the embodiment shown in Figure 5:

Scale rule 13 is a thin piece of metal of the general design shown in Figure 5, and is provided with an alignment notch 14, which notch abuts against extension frame guide 2.

The scales to be stamped upon this scale rule are described as follows:

The focal length scale measures focal length in inches or centimeters or both. Said focal length scale is stamped upon the straight portion of rule 13, with the first scale calibration being aligned with the edge of notch 14 which is perpendicular to the scale edge of rule 13, as shown by 14 in Figure 5. This scale calibration will be given the numerical value in inches or centimeters or both of the camera focal length at infinity focus, and the focal length scale will extend upon the body of rule 13 from this scale calibration to a length sufficient to measure the focal length of the camera at extended focus, as shown in Figure 5. With notch 14 abutted against extension frame guide 2 and rule 13 extended forward of the camera bed parallel to the plane in which extension bed 3 moves, the focal length at any extension of extension bed 3 is read as the end of said extension bed 3 is moved past the scale calibrations on rule 13 held beside it.

The aperture scale measures the absolute value in inches or centimeters or both of the apertures, or actual diameter, of the camera iris, irrespective of the focal length in use, and is stamped upon the curved portion of rule 13. The aperture scale will have for its lowest scale value the diameter of the smallest aperture to which the camera iris is adjustable. The highest scale value of the aperture scale will be the diameter of the largest aperture to which the camera iris is adjustable. The curved portion of the scale rule 13 is fitted above the camera's "f" scale plate 17, as shown in Figure 5, and the absolute of the iris aperture is given in inches or centimeters or both at the indicator 10 shown in Figure 2.

Reference marks 18 in Figure 5 are stamped beyond the extremities of the aperture scale on the curved portion of rule 13. Their use will be the alignment of the aperture scale with the "f" value scale stamped upon the camera's scale plate. Since both the aperture scale and the "f" value scale on the camera scale plate measure the range of adjustability of the camera iris, their lowest and highest values will have corresponding calibration positions with respect to each other. With scale rule 13 aligned with the camera's "f" value scale plate, reference marks can be scratched upon the scale plate, providing larger, more accurate and adjoining aligning marks, and eliminating the necessity of aligning the highest and lowest scale calibrations of one scale with another.

With these scales it is possible to determine with reasonable accuracy the "f" value of the camera lens when at extended focus. This factor is important in the exposure of photographic plates, since the proper timing of the shutter and the use of the exposure meter is impossible without it.

Therefore, it will be seen that my invention is a device to determine the lens value in terms of iris aperture-focal length ratio. The iris of a camera is a metal mass of movable leaves that form a circular aperture adjustable in diameter. It is inserted behind or between the elements of the lens 6 and is not considered a part of the lens itself. Since the iris controls the amount of light the lens 6 is permitted to pass, its adjustment varies the "f" or light value of the lens. All cameras with adjustable iris have a reference scale at which the iris control is set to give lens value in terms of iris aperture-focal length ratio. This scale is accurate as long as the focal length remains constant. The lens value varies inversely with the focal length; as the focal length increases the light passed through a fixed aperture decreases, thus the scale to be used at infinity focus cannot be referred to at extended focus. To compensate for this, I have invented my scales which give lens value in terms of iris aperture-focal length at any extension of the focal bed or frame.

While I have described the preferred embodiments of my invention and illustrated the same in the accompanying drawing, certain minor changes or alterations may appear to one skilled in the art to which this invention relates, during the extensive manufacture of the same, and I, therefore, reserve the right to make such alterations or changes as shall fairly fall within the scope of the appended claim.

What I claim is:

A device of the class described for use with a camera having an extension frame and a curved diaphragm aperture scale plate, said device including a straight part provided with a notch in one end, said straight part and notch being adapted to cooperate with said extension frame to measure the focal distance, and a curved scale tip having its curvature and scale cooperating with the scale on the aperture scale plate, to indicate actual effective apertures corresponding to the aperture ratio scale on said scale plate.

GLENAND SPENCER.